Jan. 6, 1925.  1,521,928
B. G. CAMPBELL
PAD CHANGING DEVICE FOR FILLING RECEPTACLES
Filed July 5, 1922  2 Sheets-Sheet 1
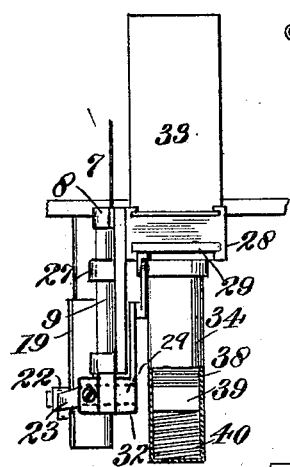
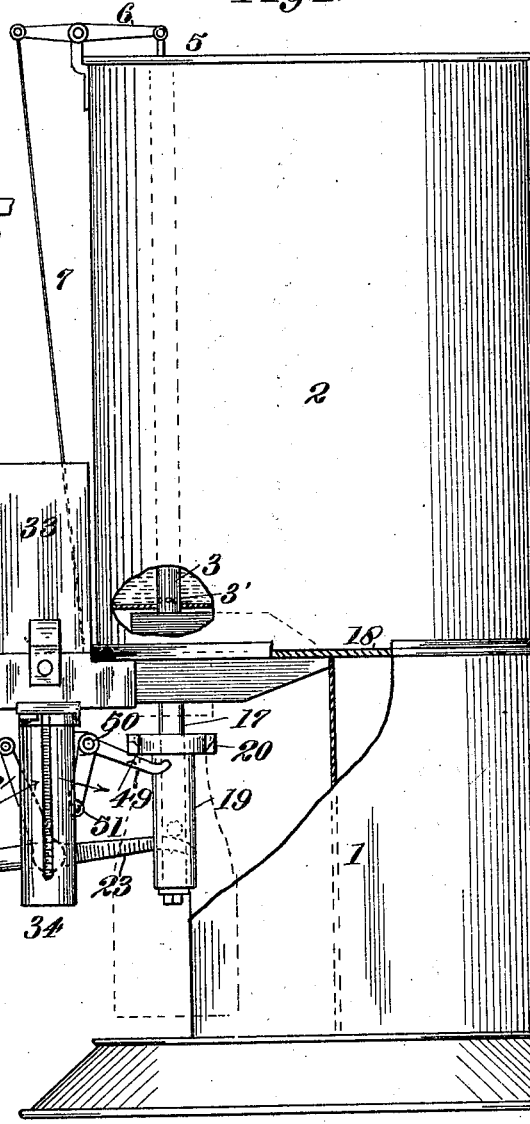
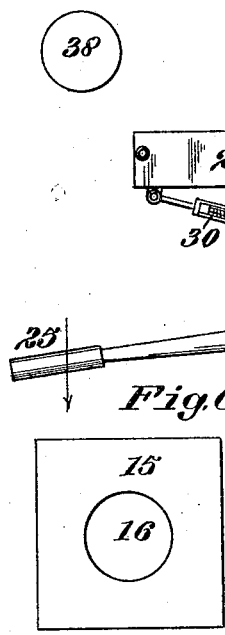
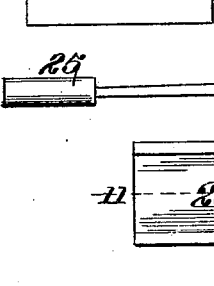
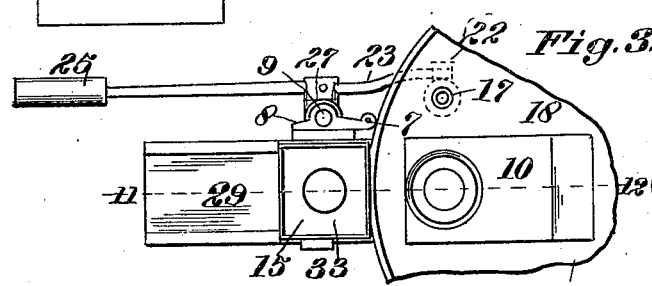

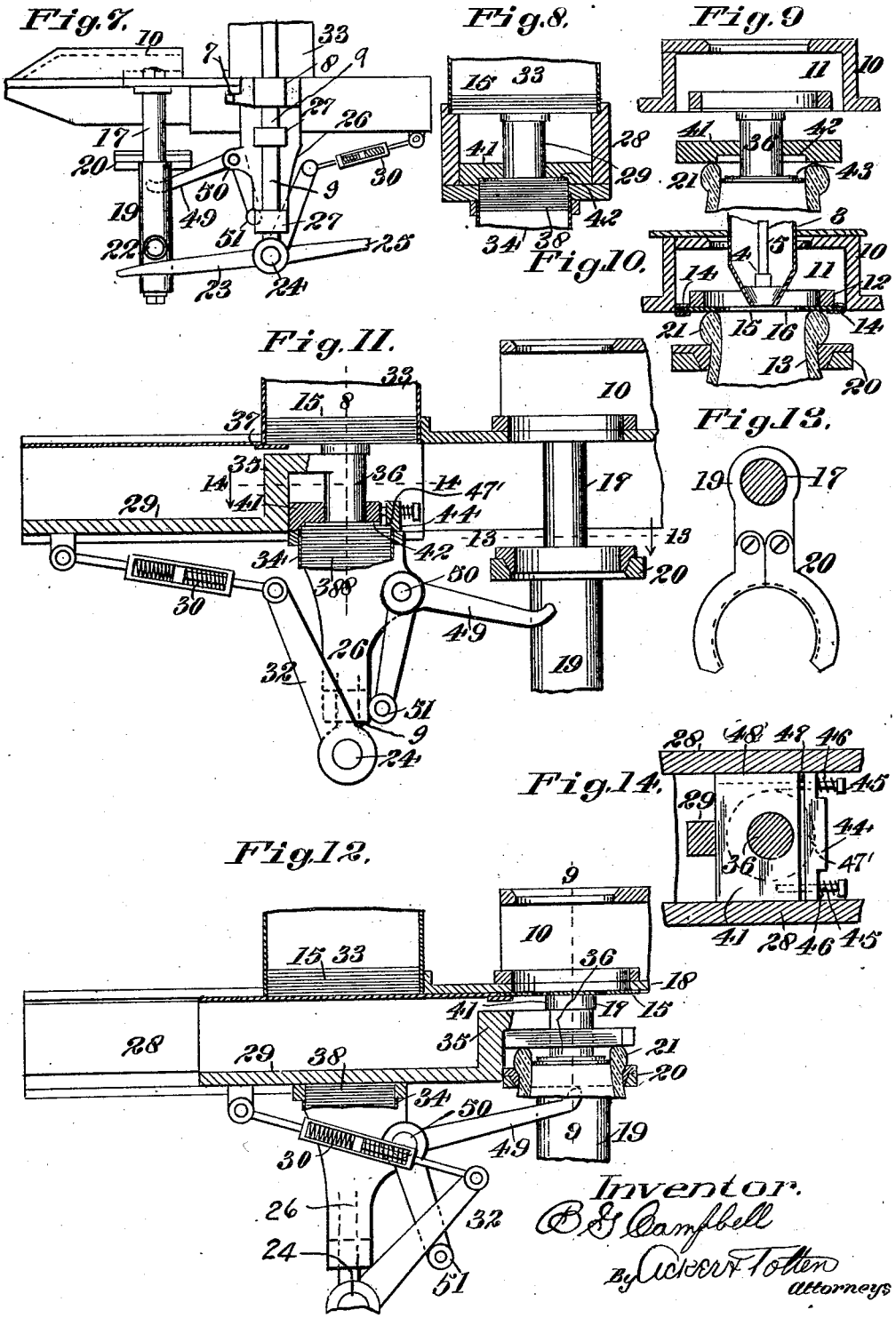

Patented Jan. 6, 1925.

1,521,928

UNITED STATES PATENT OFFICE.

BENJAMIN G. CAMPBELL, OF OAKLAND, CALIFORNIA.

PAD CHANGING DEVICE FOR FILLING RECEPTACLES.

Application filed July 5, 1922. Serial No. 572,821.

*To all whom it may concern:*

Be it known that I, BENJAMIN G. CAMPBELL, a citizen of the United States, residing at Oakland, in the county of Alameda and State of California, have invented certain new and useful Improvements in Pad-Changing Devices for Filling Receptacles, of which the following is a specification.

This invention relates to a liquid dispensing apparatus designed particularly for the public dispensation, preferably through coin controlled mechanism, of cold milk to those presenting to the apparatus the well known type of milk bottle, and on the operation of certain mechanism after properly positioning the bottle in co-operative relation with the mechanism.

The principal object of this invention is to provide a means whereby a sanitary pad or surface either in strip form or sections is provided and is positioned to contact with the peripheral mouth of the milk bottle as filled, to afford a closure therefor, and at the same time to prevent the mouth of an unclean bottle from contacting with a surface which has been used by a preceding bottle or which is to be used by a succeeding bottle.

This sanitary provision enables the filling of milk bottles generally regardless of those who present the same, or their sanitary condition, and by this apparatus the filling mechanism does not contact with the contaminated bottle, nor is the milk content to be supplied to succeeding bottles contaminated in any manner whatsoever.

A further object is to provide a construction wherein the bottle is automatically capped after being closed, thereby protecting its contents and preventing the spilling thereof.

With the above mentioned and other objects in view, the invention consists in the novel construction and combination of parts hereinafter described, illustrated in the accompanying drawings, and set forth in the claims hereto appended, it being understood that various changes in the form, proportion, size and minor details of construction within the scope of the claims may be resorted to without departing from the spirit or sacrificing any of the advantages of the invention.

To more fully comprehend the invention reference is directed to the accompanying drawings, wherein—

Figure 1 is a view in side elevation of the preferred embodiment of my invention with a part of the wall of the container and its support broken away.

Figure 2 is a view in front elevation partly in section of the pad and cap supply mechanism.

Figure 3 is a fragmentary sectional view in plan of the base of the container at the point of pad supply.

Figure 4 is a view in detail of the valve seating spring.

Figure 5 is a view in plan of the closure cap, and

Figure 6 is a view in plan of one of the sanitary disks.

Figure 7 is a view in side elevation of the transfer member and its associated levers, also the receptacle raising and lowering mechanism.

Figure 8 is a sectional view on line 8—8 of Figure 11.

Figure 9 is a sectional view on line 9—9 of Figure 12.

Figure 10 is a view similar to Figure 9 illustrating the bottle mouth in filling position in contact with the sanitary pad and prior to the opening of the valve.

Figure 11 is a sectional view on line 11—12 Figure 3 with the transfer member in retracted position.

Figure 12 is a view on line 11—12 Figure 3 with the transfer member in projecting position.

Figure 13 is a view in detail of the receptacle holder taken on line 13—13 of Figure 11.

Figure 14 is a sectional view of the cap transfer member taken on line 14—14 of Figure 11.

Referring more particularly to the several views of the drawings wherein like characters of reference designate corresponding parts, 1 indicates a supporting base mounting a fluid container 2 of any suitable size and configuration provided in its base with a tubular fluid outlet 3 controlled by a valve 4, Figure 10. The tubular outlet 3 is ported as at 3' within the container 2 to afford discharge orifices for the milk. The valve is provided with a stem 5 connected to one end of a pivotally mounted lever 6, the other end of which connects through a member 7 with a plate 8 carried by a vertically movable stud or member 9. The valve 4 is maintained normally seated by a spring 4' contacting with the upper end wall of the member 3 and with a collar 4² on the stem 5, as in Figure 4, said spring being of sufficient strength to normally maintain the member 9 in its upper position or limit of movement. The nozzle 3 is surrounded by a member 10 forming a chamber therearound, and which member supports an annular seat 12 through which the nozzle 3 discharges into the mouth of the positioned receptacle 13. On its under surface the member 10 carries sanitary pad guides 14 between which are adapted to be successively moved the sanitary pads 15 which have a rectangular periphery, and are preferably formed with a circular opening 16 in their center adapted to align with the discharge end of the nozzle 3.

A vertical stud 17 extends downwardly from the bottom wall 18 of the container 2 at one side of the nozzle 3 and the same mounts for vertical movement thereon a sleeve 19 carrying the semicircular holding frame 20 in which is adapted to be received the throat of the bottle 13, and on the periphery of which is adapted to rest the bead 21, which is formed on milk bottles now universally in use. The sleeve 19 carries a laterally projecting roller 22 with which engages the free end of the lever 23 mounted on member 24 rotatable in the lower end of rod 9, and on its opposite end the lever is provided with an operating handle 25.

The member 10 is rectangular in cross section, and is in the form of an elongated frame, it being particularly illustrated in Figures 1, 3, 11 and 12, and from one side wall thereof at its outer end depends a bracket 26 formed with a vertical guide 27 in which moves the rod 9, to the upper end of which is connected the member 8 to which is attached the valve operating connection 7. To permit the opening of valve 4 the operator grasps the lever handle 25 and moves the lever in the direction illustrated by the arrow, Fig. 1. This operation lowers member 9 in its guide and operates member 5 against the closing action of spring 4' to open valve 4. Within the rectangular frame 10 on the guide tracks 28 at the opposite sides of the lower edge thereof is a transfer member 29, connected through the yieldable spring link connection 30 with one end of an arm 32 which extends upwardly at an angle from the end of the member 24 removed from the lever 23. The transfer frame or member is movable longitudinally of the frame 10 from a point between the respective upper and lower magazines 33 and 34 to a point beneath the nozzle 3 and above the path of vertical movement of the receptacle mouth. The transfer frame or member 29 on its outer end is provided with an arm 35 carrying a vertical stud 36, adapted when the transfer member is in its retracted position to lie intermediate the aligned centers of the magazines 33 and 34. The upper magazine 33 is preferably rectangular in cross section, and is adapted to carry in stacked formation a plurality of sanitary pads 15, the lowermost pad of the series resting at its rear edge on the flange 37, which permits its forward edge to drop slightly below the lower edge of the magazine wall 33. The lower magazine is preferably cylindrical in cross section and carries a plurality of bottle closure tops 38 in stacked formation therein, and which are forced upwardly by a follower 39 which is acted on by a spring 40. The upper end of the member 36 is adapted to frictionally contact with the lowermost sanitary pad 15 within the magazine 13, and on the forward reciprocation of the transfer member 29 to remove the same from the flange 37 and convey the pad to a point with its orifice 16 aligning with the discharge of the nozzle 3 and supported beneath the seat 12 on the guides 14. With the lower end of the member 36 is associated a cap engaging member formed of the body portion 41 which is vertically slidable on the member 36. On the under surface the body 41 is provided with an annular seat 42 of a diameter to receive the uppermost closure top 38 within the lower magazine 34. The body 41 is held from dropping from the member 36 by the foot 43 which is adapted for reception within the recess 42. Associated with the body 41 is a closure top engaging portion 44 carried on guides 45 associated with the body 41 and normally pressed toward the body 41 by the springs 46. The engaging portion 44 is provided with a seat 47' which completes the contour of the seat 42 to afford a circular depression within which the closure top 38 is received. At a point overlying the lower magazine 34 is provided a releasing pin 47 for engaging the member 44 to separate the same from the member 41 on the movement of the transfer member 29 to its full retracted position, this pin operating in a guide 48 in the under surface of the transfer member 29 when the member is moved forwardly. It will be observed that on each forward movement of the transfer member, the same carries a sanitary pad 15 for positioning within the guides 14 and which removes a preceding pad from the guides, and said transfer member also carries a closure top 38 which is applied to the bottle in the hereinafter described manner. On the registering of the seat 42 with the uppermost closure cap of the stack, the pin 47 causes a separation of members 41 and 44, allowing the spring 40 to deposit a cap in the seat 42. As the member 29 is reciprocated to forward position, the pressure of pin 47 on member 44 is relieved enabling springs 45 to press member 44 toward member 36 and engage the disk between said members and within the seat 42.

A bell crank 49 fulcrumed as at 50 to the member 26 carries a roller 51 which lies within the path of movement of the arm 32 when the handle 25 is moved upwardly. The other end of said bell crank 49 is adapted to engage beneath the member 20 to raise the bottle and frame 20 as hereinafter described.

The device operates in the following manner on being assembled as in the drawings, and the magazines supplied with their respective sanitary pads and closure caps. The operator positions a bottle as in dotted lines in Fig. 1, grasps the handle 25 and depresses the same in the direction indicated by the arrow for rocking lever 23 and rotating member 24 in the rod 9 so that the other end of the lever engages the roller 22 on sleeve 19 moving said sleeve upwardly on the stud 17 and consequently raising the bottle until the mouth engages the previously positioned pad 15 as shown in Fig. 10. A further downward movement of the lever 23 effects a rocking movement thereof about roller 22 as a pivot so that the tension of spring 4' is overcome to permit the opening of the valve 4, so that the bottle will be filled with fluid. After the desired quantity of liquid is obtained in the receptacle, the handle 25 is moved upwardly, which permits spring 4' to raise rod 9, and close valve 4, and further movement drops the bottle and sleeve 19 to the normal position prior to operation of the lever. A still further upward movement of the handle will rock lever 23 and rotate member 24 in the bearing in rod 9 and move arm 32 forwardly causing an operation of transfer member 29, which in one operation removes a sanitary pad from magazine 13, conveys the same to a point beneath the nozzle 3 and positions it beneath the nozzle above the guides 14 dislodging the previous pad.

The continued movement of the handle 25 upwardly causes the arm 32 to actuate the bell crank 49, which in turn again raises the bottle, the upward movement of which causes the bottle periphery to engage the body 41 and member 44 and move the same upwardly on the member 36, which action causes the foot 43 to remove the held cap 38 from the depression 42 and position the same within the bottle mouth to close it. In this operation, the bottle holder 20 moves upwardly into the path of movement of the slide member 29 so that as the bottle raises the member 41 the slide member 29 will engage the holder 20 for preventing further movement of said slide member during the remaining upward movement of the bottle and holder for seating the cap. The foot 43 on plunger 36 also operates in holding the slide member 29 during the seating of the cap as shown in Fig. 12, while the yieldable connection 30 permits further movement of the lever 32 for raising the bottle and holder 20 during this final seating operation. The weight of the bottle will cause the lever 23 to assume its normal substantially horizontal position on pressure being released from the handle thereof to hold the lever upwardly, and this operation permits the full bottle to again assume the dotted line position, Figure 1, at which time it may be removed from the frame 20.

It will be observed that each capping operation of a bottle supplies a new unused sanitary pad surface to contact with the mouth of a succeeding bottle, therefore it is impossible, as long as the magazines are full, for the mouth of an unwashed bottle to contact with a part of the apparatus associated with the filling nozzle.

Having thus described my invention what I claim as new and desire to protect by Letters Patent of the United States is:—

1. A liquid dispensing apparatus including in combination a receptacle holder, a tubular receptacle filling member into co-operative relation with which the receptacle mouth is moved, a receptacle mouth seat associated with the filling member, and means for positioning successively unused surfaces between said seat and successive receptacle mouths and with which the same are adapted to contact during the filling operation.

2. A liquid dispensing apparatus including in combination a receptacle holder, a tubular receptacle filling member into co-operative relation with which the receptacle mouth is moved, a receptacle mouth seat associated with the filling member, a magazine for containing a plurality of ported pads in stacked formation, and means for successively removing a pad from the stack and for positioning the same between the said seat and the mouths of successive receptacles.

3. A liquid dispensing apparatus including in combination a receptacle holder, a tubular receptacle filling member into co-operative relation with which the receptacle mouth is moved, a receptacle mouth seat associated with the filling member, a magazine for containing a plurality of ported pads in stacked formation, a reciprocating slide for successively removing the lowermost pad of the stack and for positioning the same between said seat and the receptacle mouth.

4. A dispensing apparatus including a receptacle for the fluid provided with a valve controlled discharge opening in co-operative relation with which receptacles to be filled are successively moved, and means for positioning the unused portion of a ported pad intermediate the nozzle and receptacle mouth and against which the receptacle mouth contacts and through the port in which the material passes into the receptacle during the filling operation.

5. A dispensing apparatus including a receptacle for the fluid provided with a valve controlled discharge opening in co-operative relation with which receptacles to be filled are successively moved, means for positioning the unused portion of a ported pad intermediate the nozzle and receptacle mouth and against which the receptacle mouth contacts and through the port in which the material passes into the receptacle during the filling operation, and for subsequently supplying a closure cap to the mouth of the receptacle.

6. A fluid dispensing apparatus including a receptacle for the fluid provided with a valve controlled discharge, a receptacle holder member movable to and from said discharge, a magazine adapted to contain a plurality of ported pads in stacked formation, means for successively removing the pads from said magazine and for positioning the same adjacent said nozzle for contacting with the receptacle mouth on the movement of the same to filling position toward said valve controlled discharge.

7. A fluid dispensing apparatus including a receptacle for the fluid provided with a valve controlled discharge, a receptacle holding member movable to and from said discharge, a pair of magazines, one for containing a plurality of ported pads in superimposed relation and the other containing a plurality of receptacle closures in superimposed relation, a transfer member adapted for removing a member from each of said magazines and for positioning the same within the path of movement of the receptacle toward said discharge.

8. A fluid dispensing apparatus including a receptacle for the fluid provided with a valve controlled discharge, a receptacle holding member movable to and from said discharge, a pair of magazines disposed with their discharge ends in opposing spaced relation, the upper adapted for containing a plurality of ported pads in stack formation and the lower containing a plurality of receptacle closures in stack formation, a transfer member mounted to reciprocate between the discharge ends of said magazines for removing a member from each and for positioning the same within the movement of said receptacle toward said discharge.

9. A fluid dispensing apparatus including a receptacle for the fluid provided with a valve controlled discharge, a receptacle holding member movable to and from said discharge, a pair of magazines disposed with their discharge ends in opposing spaced relation, the upper adapted for containing a plurality of ported pads in stack formation, and the lower containing a plurality of receptacle closures in stacked formation, a transfer member mounted to reciprocate between the discharge ends of said magazines for removing a member from each and for positioning the same within the movement of said receptacle toward said discharge, said transfer member provided with means for engaging the closure member conveyed, a guide on the transfer member on which said closure engaging means is movably supported, said guide provided with a closure applying head for removing the closure from the head on the upward movement of the receptacle toward said orifice.

10. A fluid dispensing apparatus including a receptacle for the fluid provided with a valve controlled discharge orifice, a stop for limiting the movement of the receptacle mouth toward the orifice, a receptacle holding member movable to and from said orifice, a magazine for containing a plurality of pads in stack formation and each formed with an opening through which the fluid is adapted to pass during the filling operation, a reciprocating transfer member adapted for removing one of said pads from said magazine and for positioning the same between the said stop and the receptacle mouth to afford a clean surface with which the receptacle mouth is adapted to contact during the filling operation.

11. A fluid dispensing apparatus including a receptacle for the fluid provided with a valve controlled discharge orifice, a stop for limiting the movement of the receptacle mouth orifice, a receptacle holding member movable to and from said orifice, a magazine for containing a plurality of pads in stack formation and each formed with an opening through which the fluid is adapted to pass during the filling operation, a reciprocating transfer member adapted for removing one of said pads from said magazine and for positioning the same between the said stop and the receptacle mouth to afford a clean surface with which the receptacle mouth is adapted to contact during the filling operation, and means for operating said receptacle holding member to move the receptacle to and from said orifice and for opening the said valve only on the movement of the receptacle mouth into contact with said ported pad.

12. A receptacle filling apparatus including in combination a fluid container provided with a discharge orifice, a receptacle holding member movable to and from the same, a receptacle pad seat associated with the orifice, a pair of magazines one for containing a plurality of receptacle mouth seat pads and the other a plurality of receptacle mouth closures, a transfer member movable between said magazines and across the path of movement of the receptacle, means for operating said transfer member and for imparting successive strokes of different lengths to said receptacle holding member, said transfer member adapted on successive movements to alternately position within the upward path of movement of the receptacle a seat pad and a receptacle mouth closure.

13. A receptacle filling apparatus including in combination a fluid container provided with a discharge orifice, a receptacle holding member movable to and from the same, for the filling of the receptacle, a magazine adapted to contain a plurality of receptacle closures, a transfer member for engaging one of said closure members and for positioning the same in alignment with the receptacle mouth, and including a gripping member, a stud on which the same is vertically movable, a head on said stud adapted to pass through the gripping member on its upward movement to remove the closure member therefrom, means for raising said receptacle holding member to filling and capping position, and means for moving said transfer member intermediate the receptacle mouth and orifice during said capping movement.

14. A receptacle filling apparatus including in combination a fluid container provided with a discharge orifice, a receptacle holding member movable to and from the same for the filling of the receptacle, a magazine adapted to contain a plurality of receptacle closures therein, a transfer member for engaging one of said closure members and for positioning the same in alignment with the receptacle mouth and including a vertically movable gripping member yieldably engaging the closure cap, means for raising said receptacle holding member to filling and capping position, means for moving said transfer member to position the closure cap in a line with the upward movement of the receptacle mouth during its capping movement, and means associated with the transfer member for holding the closure cap from vertical movement and for releasing the same from said gripping member and inserting the same within the receptacle mouth during the upward capping movement of said receptacle.

15. A receptacle filling apparatus including in combination a fluid container provided with a discharge orifice, a receptacle holding member movable to and from the same, a valve for controlling said orifice, means for moving a ported surface for engagement by the receptacle mouth on the upward movement thereof to filling position to afford an annular closure for the mouth thereof, and a lever adapted for movement for operating said means to supply said ported surface, then raise the receptacle to cause the mouth thereof to contact with said surface and lastly to open said valve.

16. A filling apparatus including a container provided with a valve controlled discharge orifice, means for holding a receptacle and for moving the mouth thereof to and from said discharge orifice, means for positioning a surface adjacent said nozzle and with which the receptacle mouth contacts to seal the same during the filling operation, a lever, and operating connections between the same and said receptacle holding member whereby the surface is positioned in co-operative relation with the orifice, the receptacle is then moved to filling position with its mouth in contact with said surface and the valve is lastly opened.

In testimony whereof I have signed my name to this specification.

BENJAMIN G. CAMPBELL.